(12) United States Patent
Hoshino (10) Patent No.: US 9,932,653 B2
(45) Date of Patent: Apr. 3, 2018

(54) METAL ION RECOVERY DEVICE AND METAL ION RECOVERY METHOD

(71) Applicant: National Institutes for Quantum and Radiological Science and Technology, Chiba-shi (JP)

(72) Inventor: Tsuyoshi Hoshino, Aomori (JP)

(73) Assignee: National Institutes for Quantum and Radiological Science and Technology, Chiba-shi (JP)

( * ) Notice: Subject to any disclaimer, the term of this patent is extended or adjusted under 35 U.S.C. 154(b) by 0 days.

(21) Appl. No.: 14/910,973

(22) PCT Filed: Aug. 7, 2014

(86) PCT No.: PCT/JP2014/070806
§ 371 (c)(1),
(2) Date: Feb. 8, 2016

(87) PCT Pub. No.: WO2015/020121
PCT Pub. Date: Feb. 12, 2015

(65) Prior Publication Data
US 2016/0201163 A1    Jul. 14, 2016

(30) Foreign Application Priority Data

Aug. 8, 2013  (JP) ................. 2013-165034

(51) Int. Cl.
*C22B 9/10*        (2006.01)
*C22B 26/22*       (2006.01)
(Continued)

(52) U.S. Cl.
CPC ............. *C22B 26/22* (2013.01); *B01D 61/46* (2013.01); *C01D 15/08* (2013.01); *C22B 3/24* (2013.01);
(Continued)

(58) Field of Classification Search
CPC ........... C25C 3/02; C25C 7/04; B01D 61/422; B01D 2311/06
See application file for complete search history.

(56) References Cited

U.S. PATENT DOCUMENTS 5,290,405 A    3/1994 Joshi et al.
5,580,430 A   12/1996 Balagopal et al.
(Continued)

FOREIGN PATENT DOCUMENTS

JP    H06-073586 A    3/1994
JP    H10-102270 A    4/1998
(Continued)

*Primary Examiner* — Arun S Phasge
(74) *Attorney, Agent, or Firm* — Hawaii Patent Services; Nathaniel K. Fedde; Kenton N. Fedde (57) ABSTRACT

Problem is to selectively and inexpensively recover a metal ion in a liquid.
Solution is a metal ion recovery device, in which a permselective membrane for selectively permeating Li is used, and on both main faces of the plate-like permselective membrane, a mesh-like negative electrode and a positive electrode are formed, respectively. This structure is provided in a treatment tank, and in the treatment tank, the permselective membrane partitions between a stock solution containing a Li ion, and a recovery solution into which Li is recovered. As the permselective membrane, lithium nitride ($Li_3N$), $Li_{10}GeP_2S_{12}$, ($La_x$, $Li_y$)$TiO_z$, $Li_{1+x+y}Al_x(Ti, Ge)_{2-x}Si_yP_{3-y}O_{12}$, and the like, which are super lithium ion conductors, can be used.

11 Claims, 13 Drawing Sheets

(51) Int. Cl.
*B01D 61/46* (2006.01)
*C01D 15/08* (2006.01)
*C22B 3/24* (2006.01)
*C22B 26/10* (2006.01)
*C22B 26/12* (2006.01)
*C25B 13/04* (2006.01)
*B01D 61/42* (2006.01)

(52) U.S. Cl.
CPC ............ *C22B 9/10* (2013.01); *C22B 26/10* (2013.01); *C22B 26/12* (2013.01); *C25B 13/04* (2013.01); *B01D 61/422* (2013.01); *B01D 2311/06* (2013.01); *B01D 2311/08* (2013.01); *B01D 2311/25* (2013.01); *Y02P 10/234* (2015.11)

(56) References Cited

U.S. PATENT DOCUMENTS

| | | |
|---|---|---|
| 5,593,552 A | 1/1997 | Joshi et al. |
| 5,951,843 A | 9/1999 | Itoh et al. |
| 2010/0242995 A1* | 9/2010 | Xiong ................. B01D 61/422 134/13 |
| 2011/0174739 A1 | 7/2011 | Chung et al. |

FOREIGN PATENT DOCUMENTS

| | | |
|---|---|---|
| JP | H10-102271 A | 4/1998 |
| JP | H10-102272 A | 4/1998 |
| JP | H11-209887 A | 8/1999 |
| JP | 2003-245672 A | 9/2003 |
| JP | 2009-161794 A | 7/2009 |

* cited by examiner

METAL ION RECOVERY DEVICE AND METAL ION RECOVERY METHOD

BACKGROUND OF THE INVENTION

Field of the Invention

The present invention relates to a metal ion recovery device and a metal ion recovery method for selectively recovering a specific metal (for example, lithium) ion in a liquid.

Description of the Related Art

In recent years, the industrial importance of lithium (Li) has been increased, because it is used as a material for lithium ion batteries, and in production of a fuel for nuclear fusion reactors. For example, large-sized lithium ion batteries are used as a power supply for electric vehicles, and for storage of electricity in smart grids and smart houses. For such applications, a technique for inexpensively production of large-sized lithium ion batteries is required. On the other hand, for nuclear fusion reactors, tritium, which serves as a fuel for nuclear fusion, is produced by using Li, and therefore a large amount of lithium is required.

Li can be extracted from ores, however, it is known that Li is contained in the seawater, and an enormous total amount of Li is contained in the whole seawater on the earth. Therefore, if Li can be extracted from the seawater, a large amount of Li can be inexpensively acquired.

Thus, there has been proposed a technique for recovering Li from a solution containing Li. In Patent Documents 1 and 2, there is disclosed a technique for selectively recovering Li by causing Li (ion) to be selectively adsorbed to an adsorber in the seawater, and thereafter desorbing the lithium ion from the adsorber. As the adsorber, the technique disclosed in Patent Document 1 uses manganese oxide, while, with the technique disclosed in Patent Document 2, a vinyl monomer material is used.

By using such a technique, Li can be extracted from the seawater. In addition, by using the same technique, lithium can be selectively recovered from a liquid other than seawater, for example, a waste liquid containing Li (ion). Therefore, such a technique is extremely effective for inexpensively acquiring Li. In addition, by selecting a material for the adsorbing body, a metal other than Li can be recovered by using the same method.

CITATION LIST

Patent Documents

Patent Document 1: Japanese Patent Application Laid-open No. 2012-504190

Patent Document 2: Japanese Patent Application Laid-open No. 2009-161794

However, the techniques disclosed in Patent Documents 1 and 2 require two steps of causing Li to be adsorbed, and then desorbing it. Therefore, the production process has become complicated. Further, the selectivity of Li in adsorption thereof to the adsorbing body used with the techniques disclosed in Patent Documents 1 and 2 is not high. Consequently, in the case where such method is applied to, for example, the seawater, sodium (Na), which, like Li, is an alkaline metal, is also adsorbed at the same time. Therefore, it has been required that Li be further selectively recovered from among the metals including the other metals recovered at the same time.

In addition, the material constituting the above-mentioned adsorber involves deterioration in properties during use, whereby it has required frequent replacement, and in addition is expensive.

Consequently, it has been difficult to selectively and inexpensively recover the metal (lithium) ion in the liquid.

The present invention has been made in view of such problems, and it is an object of the present invention to provide a metal ion recovery device and a metal ion recovery method which are capable of solving the above problems.

SUMMARY OF THE INVENTION

In order to solve the above problems, the present invention has been constituted as follows.

One aspect of the present invention provides a metal ion recovery device for, from a stock solution as an aqueous solution containing a metal in the form of a metal ion, recovering said metal ion into a recovery solution, including: a plate-like permselective membrane constituted by an ion conductor of said metal, a mesh-like positive electrode fixed to one main face of said permselective membrane, and a mesh-like negative electrode fixed to the other main face of said permselective membrane, said stock solution and said recovery solution being partitioned by said permselective membrane, said positive electrode and said negative electrode being fixed thereto.

Another aspect of the present invention provides a metal ion recovery device, wherein, between one main face of said permselective membrane and said positive electrode, and between the other main face of said permselective membrane and said negative electrode, a sheet-like current collector formed of a material which is porous, electrically conductive, and flexible is inserted, respectively.

Another aspect of the present invention provides a metal ion recovery device, wherein, on one main face and the other main face of a structure in which a plurality of single bodies of said permselective membrane are bonded to one another in an in-plane direction, a single piece of said current collector is provided, respectively.

Another aspect of the present invention provides a metal ion recovery device, wherein said current collector is formed of a carbon felt sheet.

Another aspect of the present invention provides a metal ion recovery device, wherein there is provided a configuration in which said recovery solution is circulated.

Another aspect of the present invention provides a metal ion recovery device, wherein said metal is lithium (Li).

Another aspect of the present invention provides a metal ion recovery device, wherein said permselective membrane is formed of any one of $Li_3N$, $Li_{10}GeP_2S_{12}$, $(La_x, Li_y)TiO_z$ (where $x=2/3-a$, $y=3a-2b$, $z=3-b$, $0<a\leq1/6$, $0\leq b\leq0.06$, and $y>0$), and $Li_{1+x+y}Al_x(Ti, Ge)_{2-x}Si_yP_{3-y}O_{12}$ (where $0\leq x\leq0.6$, and $0\leq y\leq0.6$).

Another aspect of the present invention provides a metal ion recovery device, wherein said recovery solution is hydrochloric acid (HCl).

Another aspect of the present invention provides a metal ion recovery device, wherein said metal is cesium (Cs), potassium (K) or magnesium (Mg).

Another aspect of the present invention provides a metal ion recovery method for recovering said metal ion contained in said stock solution into said recovery solution by using said metal ion recovery device.

Another aspect of the present invention provides a metal ion recovery method for recovering said metal ion contained in said stock solution into said recovery solution by using said metal ion recovery device, and then adding sodium carbonate ($Na_2CO_3$) to said recovery solution.

Another aspect of the present invention provides a metal ion recovery method, wherein a voltage is applied across said positive electrode and said negative electrode.

The present invention is constituted as above, and thus it allows the metal ion in the liquid to be selectively and inexpensively recovered.

DETAILED DESCRIPTION OF THE PREFERRED EMBODIMENT

Hereinbelow, a metal ion recovery device and a metal ion recovery method according to an embodiment of the present invention will be explained. With this metal ion recovery device and metal ion recovery method, a metal (lithium) ion in an aqueous solution is recovered by causing it to permeate through a permselective membrane for selectively permeating the metal (lithium) ion. With this configuration, the permselective membrane, which has a high selective permeability, is used together with electrodes, and the like, which are formed to increase the permeability.

Figure 1:
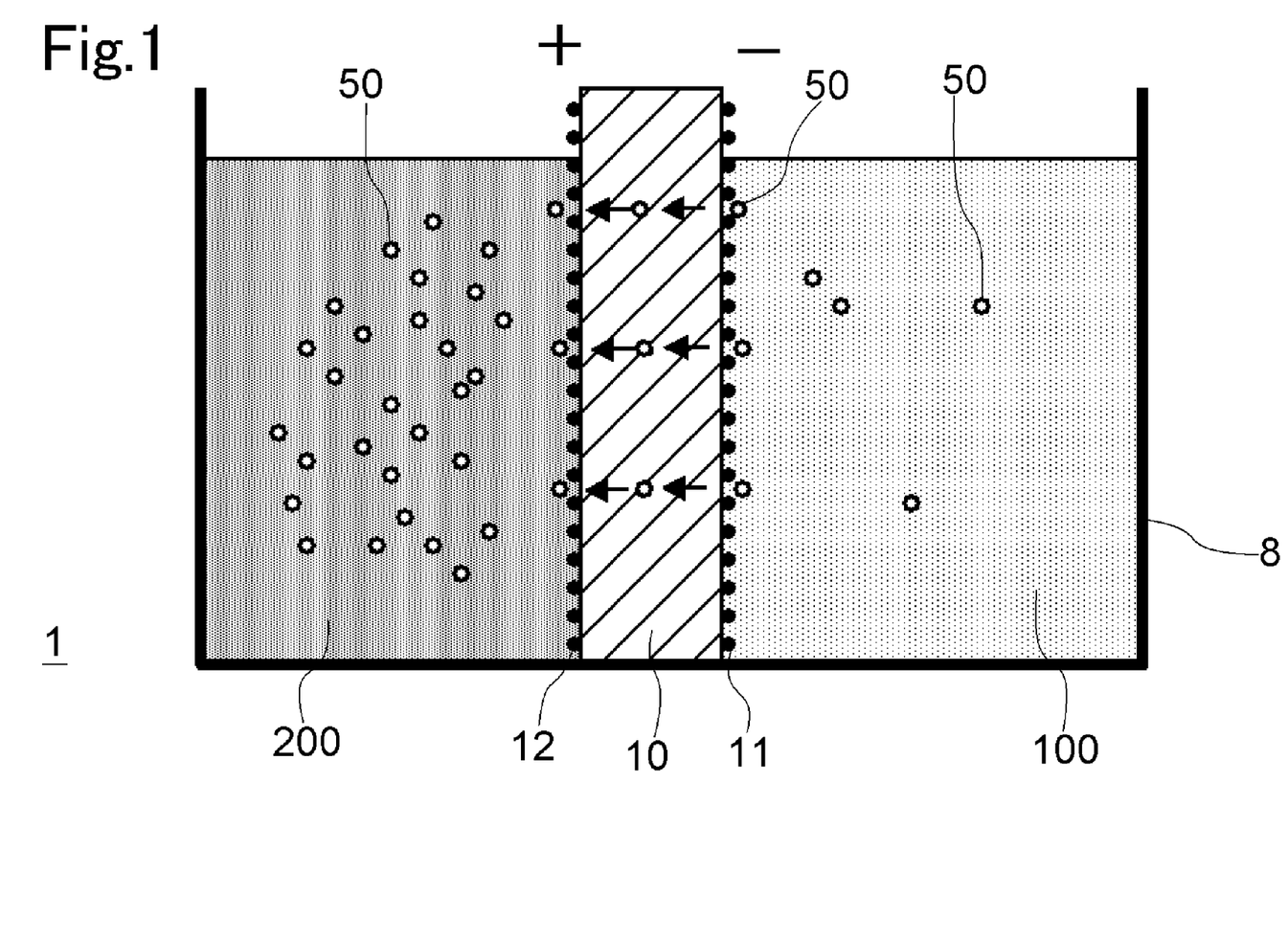
FIG. 1 is a figure showing a configuration of a metal (Li) ion recovery device according to an embodiment of the present invention.

FIG. 1 is a configuration drawing illustrating the principle of the metal (Li) ion recovery device 1. With this metal ion recovery device 1, a permselective membrane 10 for selectively permeating Li is used, and on both main faces of the permselective membrane 10, which is plate-like, a negative electrode 11 and a positive electrode 12, which are mesh-like, are formed respectively. Such structure is provided in a treatment tank 8, and a stock solution 100 containing a Li ion 50 and a recovery solution 200, where Li is recovered, are partitioned from each other by the permselective membrane 10 in the treatment tank 8. The negative electrode 11 is provided with a negative potential, while the positive electrode 12 with a positive potential.

As the permselective membrane 10, lithium nitride ($Li_3N$), $Li_{10}GeP_2S_{12}$, $(La_x, Li_y)TiO_z$ (where $x=2/3-a$, $y=3a-2b$, $z=3-b$, $0<a\leq1/6$, $0\leq b\leq0.06$, and $y>0$), which are super lithium ion conductors, and $Li_{1+x+y}Al_x(Ti, Ge)_{2-x}Si_yP_{3-y}O_{12}$ (where $0\leq x\leq0.6$, and $0\leq y\leq0.6$), which is an Li substitutional NASICON (Na Super Ionic Conductor) type crystal, and the like, can be used. These materials, can be obtained as, for example, a plate-like sintered compact. These materials each exhibit an (Li) ionic conductivity higher than $10^{-4}$ to $10^{-3}$ $Scm^{-1}$.

Figure 2:
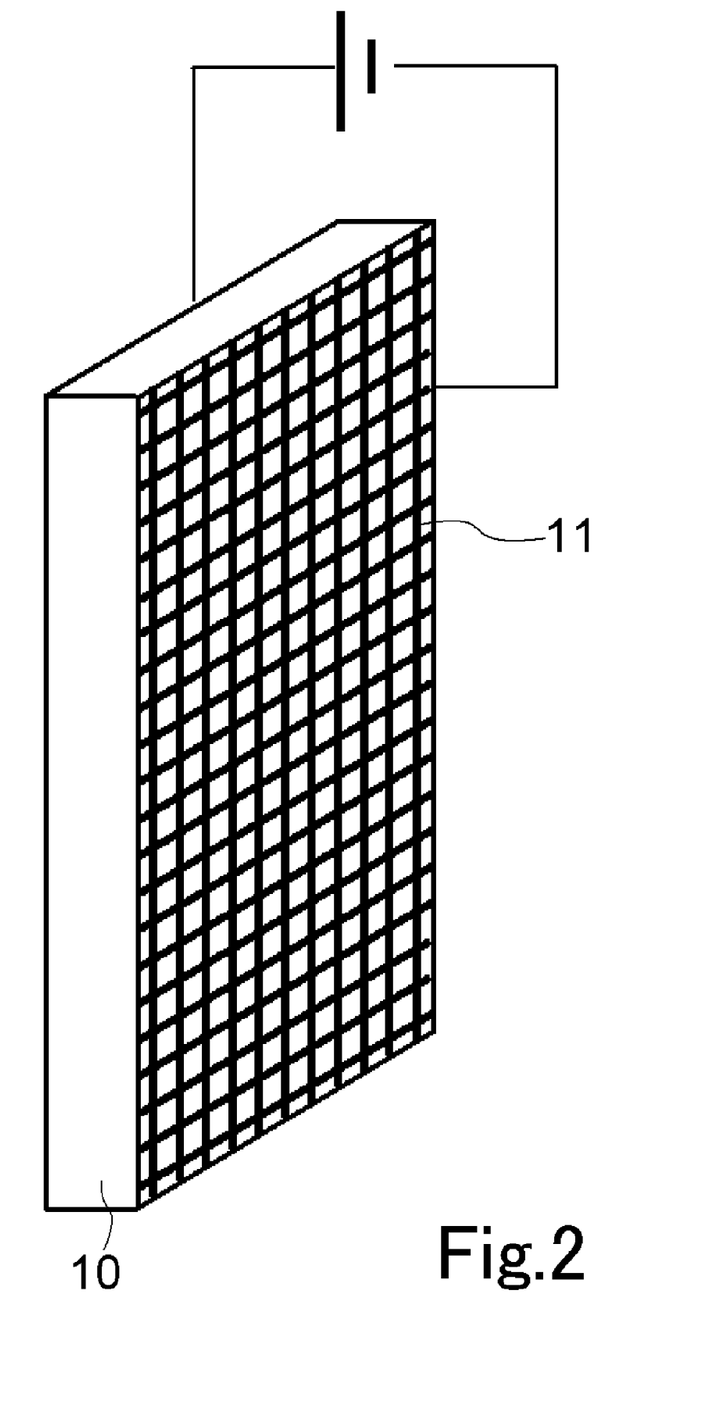
FIG. 2 is a perspective view showing the relationship between a permselective membrane and positive and negative electrodes in the metal (Li) ion recovery device according to the embodiment of the present invention.

The negative electrode 11 and the positive electrode 12 are bonded to a right face (one main face) of the permselective membrane 10, and a left face (the other main face) of the same, in FIG. 1, respectively. FIG. 2 is a perspective view of this form. In FIG. 2, on the face on the other side of the permselective membrane 10, the positive electrode 12, which has the same shape as that of the negative electrode 11, is provided in the same manner. With this configuration, the right face and the left face of the permselective membrane 10 are held at a constant negative potential and a constant positive potential, respectively. As the material for the negative electrode 11, and that for the positive electrode 12, a metallic material which will not cause an electrochemical reaction in the stock solution 100 or the recovery solution 200 can be used in an appropriate manner, respectively. For example, SUS, Ti, a Ti—Ir alloy, and the like, can be used.

The above-mentioned materials which can be used as the permselective membrane 10 are a solid, however, they are known to exhibit an electrical conductivity, the Li ion flowing in the crystal in a mode close to that of a free electron. Specifically, in the configuration shown in FIG. 1, in the case where the negative electrode 11 is provided with a negative potential, and the positive electrode 12 with a positive potential, the ones among the Li ions 50 (positive ions) that have reached the right face of the permselective membrane 10 in the stock solution 100 provided on the side of the negative electrode 11 flow from the right face of the permselective membrane 10 toward the left face by ionic conduction. The Li ions 50 which have reached the left face or the permselective membrane 10 are recovered into the recovery solution 200. As a result of this, after a predetermined time having elapsed, the concentration of Li ions in the stock solution 100 is lowered, while that of Li ions in the recovery solution 200 being increased.

Figure 3:
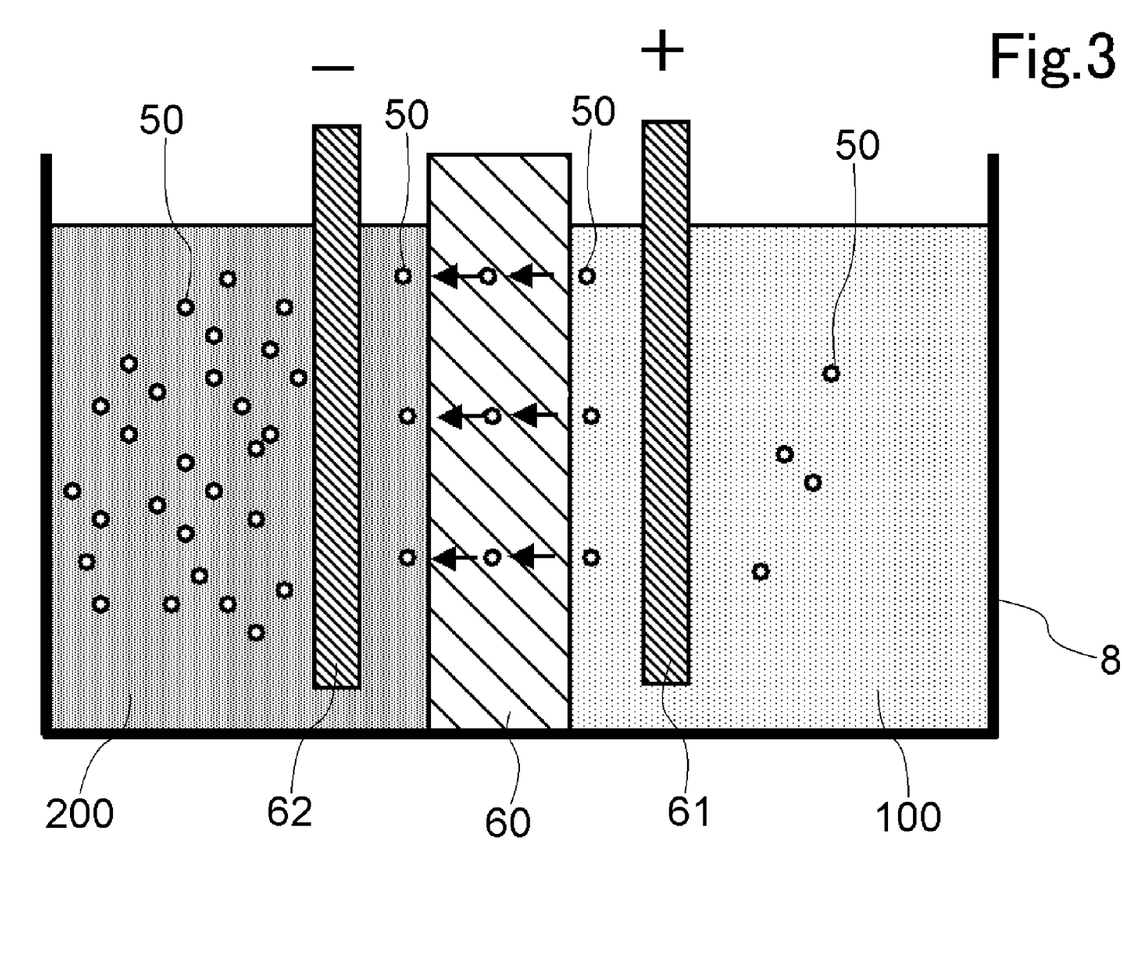
FIG. 3 is a figure showing a configuration in electrodialysis, which provides a comparative example.

Here is a discussion about the reasons why the above-mentioned configuration is advantageous. As a comparative example which is similar to the above-mentioned configuration, an electrodialysis tank, which utilizes a partition and an electric field in the same manner for recovering a specific metal ion, is known. FIG. 3 is a figure for explaining the principle of electrodialysis in correspondence to FIG. 1. Here, as a partition 60 between the stock solution 100 and the recovery solution 200, a material known as an ion exchange membrane is used. The positive ions (Li ions 50) flow from the electrodialysis anode 61 in the stock solution 100 toward the electrodialysis cathode 62 in the recovery solution 200, however, at this time, the partition 60 causes only the positive ions to be selectively permeated from the right side to the left side, and thus as with the configuration in FIG. 1, allows the Li ions 50 to be moved from the stock solution 100 to the recovery solution 200.

However, in this case, the Li ions 50 actually flow through the partition 60 (ion exchange membrane) in the form of hydrated ions, and will not flow in the form of Li$^+$. Therefore, the selectivity for Li ion 50 is not high.

On the other hand, the ionic conduction in the super lithium ion conductor used as the above-mentioned permselective membrane 10 is carried out with the Li atoms (ions) being sequentially moved between sites in the crystal lattice into which Li is to originally enter, and thus only the Li atoms (ions) are transmitted through the membrane. Therefore, a high selectivity is obtained.

However, in the case where the above-mentioned super lithium ion conductor was used in place of the partition 60 in FIG. 3, the Li ions 50 could not be moved from the stock solution 100 to the recovery solution 200, with the super lithium ion conductor having had a deterioration. The cause for this can be considered to be that, in the configuration in FIG. 3, an electrochemical reaction (electrolysis, or the like) was generated in the above-mentioned super lithium ion conductor (a compound) itself. In other words, the above-mentioned super lithium ion conductor has a high ionic conductivity to thereby provide a high selectivity, while it tends to have a deterioration due to an electrochemical reaction.

Accordingly, in the configuration in FIG. 1, the negative electrode 11 and the positive electrode 12 are tightly contacted with the permselective membrane 10 such that the electric field is formed only within the permselective membrane 10. Further, in order to make the respective potentials of the right face and the left face of the permselective membrane 10 constant, and bring the right face of the permselective membrane 10 into contact with the solution 100, and the left face of the same into contact with the recovery solution 200, respectively, the negative electrode 11 and the positive electrode 12 are formed to be mesh-like.

In other words, with the configuration shown in FIGS. 1 and 2, using the permselective membrane 10 constituted by a super lithium ion conductor can particularly increase the recovery efficiency of Li ion. Further, a plurality of permselective membranes 10, each being combined with the negative electrode 11 and the positive electrode 12, may be provided in a right-left direction in FIG. 1. In addition, in the configuration in FIG. 1, even when a voltage is not applied, there occurs a potential difference between the negative electrode 11 and the positive electrode 12, resulting from an electrochemical reaction. Further, if there exists a difference in Li concentration between the stock solution 100 and the recovery solution 200, then the difference causes Li ions to flow through the permselective membrane 10. In other words, even if no voltage is applied from the outside, Li ions can be recovered.

Figure 4:
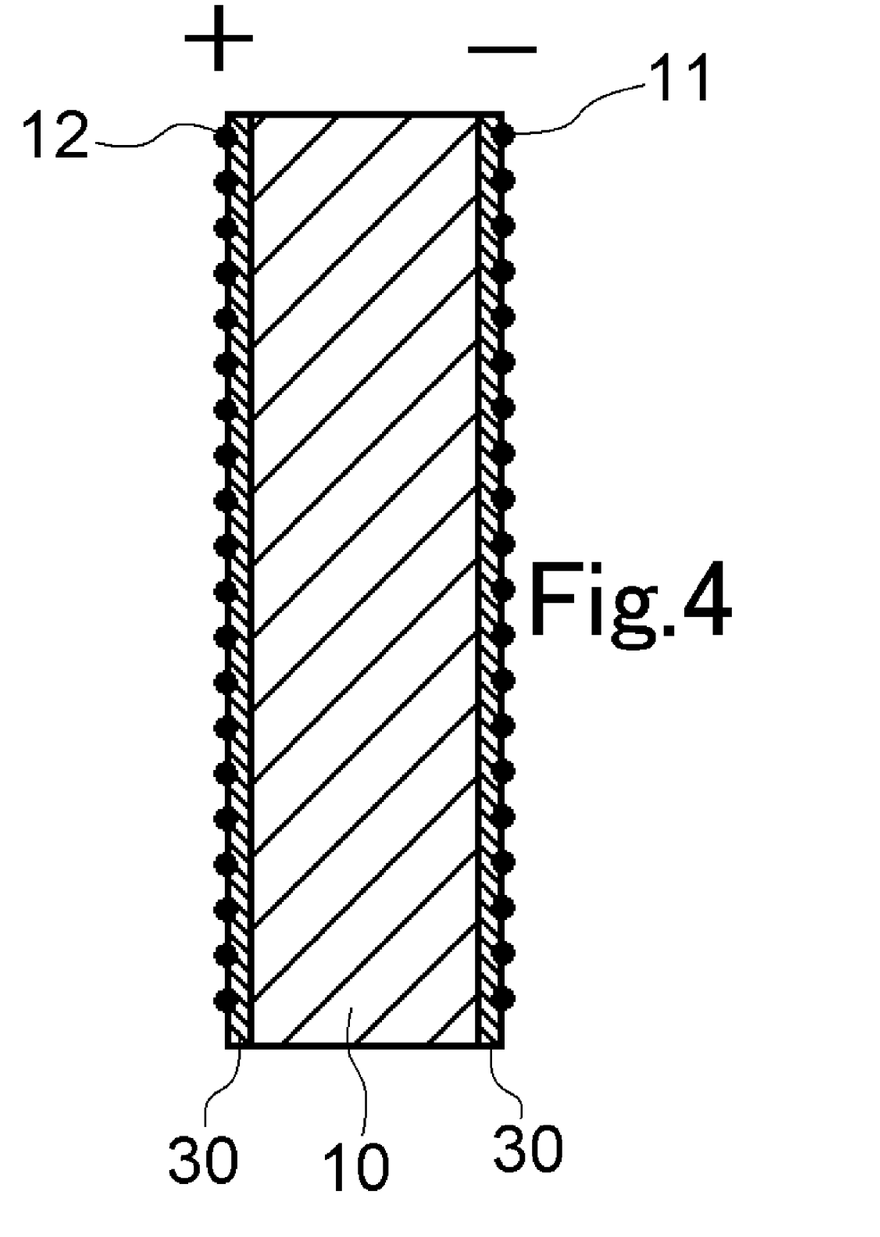
FIG. 4 is a figure illustrating a critical component unit which uses a current collector in the metal (Li) ion recovery device according to the embodiment of the present invention.

In this way, in order to make the potentials of the surfaces of the permselective membrane 10 (super lithium ion conductor) constant, and bring the surfaces into contact with the stock solution 100 and the recovery solution 200, it is effective to interpose a current collector 30 between the mesh-like negative electrode 11 and the permselective membrane 10, and between the mesh-like positive electrode 12 and the same as shown in, for example, FIG. 4. Here, as the current collector 30, a sheet-like substance which is electrically conductive, porous, and flexible, such as a carbon felt sheet, or a sheet formed of fibers of such a metal as Ti, can be used.

As described above, the super lithium ion conductor to be used as the permselective membrane 10 is often available as a sintered compact. In such a case, the surface is not flat, being often constituted by fine irregularities. Therefore, in order to make the potentials of the surfaces of the permselective membrane 10 constant, and to provide a configuration in which the surfaces are in contact with the stock solution 100 and the recovery solution 200, respectively, it is particularly effective to use the current collector 30, which is electrically conductive and flexible, for increasing the adhesiveness to the surface having irregularities. Further, by making the current collector 30 porous, the state in which the permselective membrane 10 is in contact with the stock solution 100 and the recovery solution 200 is maintained.

Figure 5:
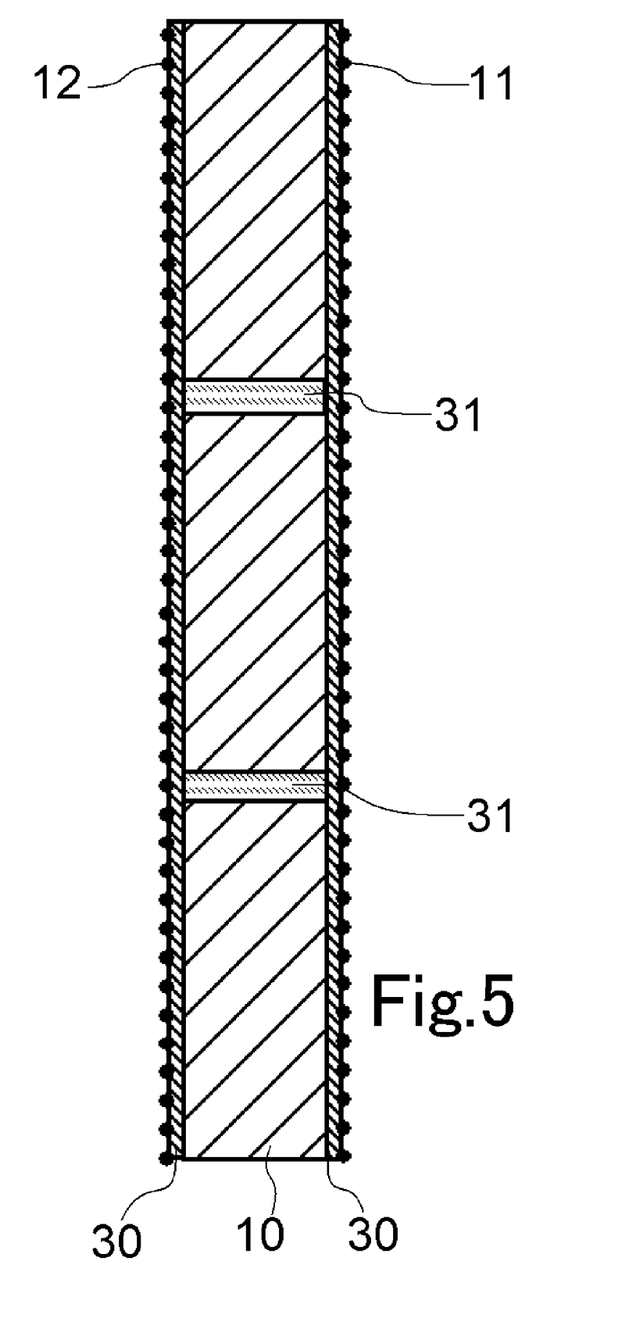
FIG. 5 is a figure illustrating a critical component unit which uses a plurality of permselective membranes in the metal (Li) ion recovery device according to the embodiment of the present invention.

In addition, a sintered compact of the above-mentioned super lithium ion conductor having a size of, for example, 5 cm square or so can be inexpensively manufactured, however, in order to recover Li on a large scale, it is required that the permselective membrane 10 be larger in size. In such a case, for example, as shown in FIG. 5, by bonding a plurality of permselective membranes 10 to one another with a bonding layer 31 formed of an insulating resin material, or the like, in an in-plane direction thereof to substantially provide a large area, and using the above-mentioned current collector 30 thereon, a permselective membrane substantially having a large area can be obtained. As the current collector 30, the one which is integrated as a single piece can be used on the respective right and left faces which are provided with a large area. Thereby, the entire unit is provided with a mechanical reinforcement, and a large quantity of stock solution 100 can be treated. Thus, also in providing a permselective membrane substantially having a large area, the current collector 30 is effective.

Figure 6:
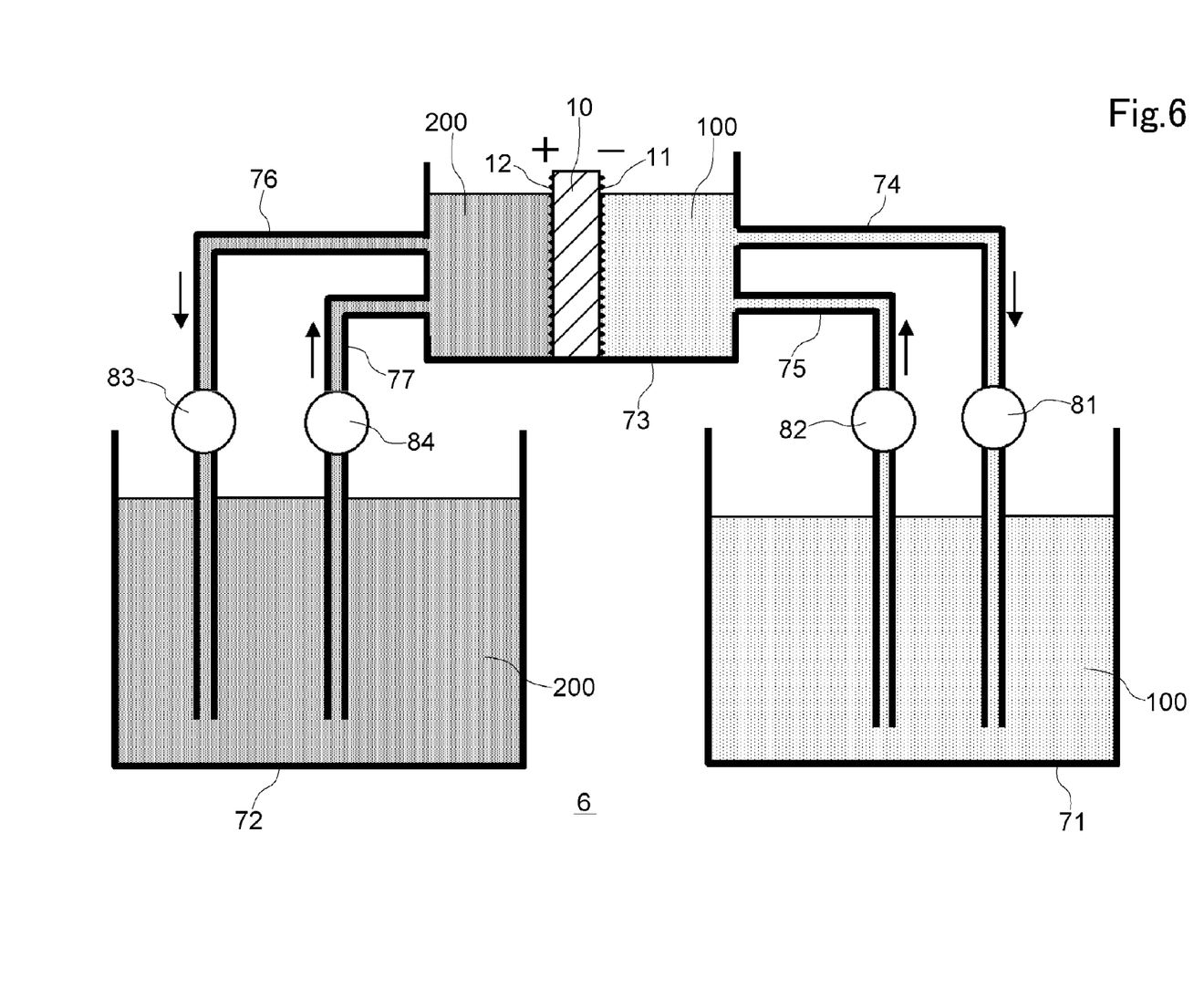
FIG. 6 is a figure showing a configuration of a modification of the metal (Li) ion recovery device according to the embodiment of the present invention.

Next, FIG. 6 is a figure showing a configuration of a metal ion recovery device 6 (a modification) with which the configuration of the metal ion recovery device in FIG. 1 is improved in order to treat a large quantity of stock solution 100. In this metal ion recovery device 6, the stock solution 100 is stored in a stock solution storage tank 71 with a large capacity, while the recovery solution 200 is stored in a recovery solution storage tank 72 with a large capacity. Between a treatment tank 73 having the same configuration as that in FIG. 1 and the stock solution storage tank 71, the stock solution 100 is circulated using a stock solution piping 74, 75 and a pump 81, 82, while, between the treatment tank 73 and the recovery solution storage tank 72, the recovery solution 200 is circulated with the use of a recovery solution piping 76, 77 and a pump 83, 84. Therefore, with no need for making the treatment tank 73 or the permselective membrane 10, and the like, large in size, a large quantity of stock solution 100 can be treated. The stock solution storage tank 71, the stock solution piping 74, 75, the recovery solution storage tank 72, and the recovery solution piping 76, 77 can be provided in an arbitrary form.

With this configuration, in recovery treatment of Li, the stock solution 100 is circulated using the pump 81, 82, whereby a large quantity of stock solution 100 can be treated, with no need for making the treatment tank 73 (permselective membrane 10, and the like) large in size. Along with this, the total quantity of the recovery solution 200 provided on the side of recovering Li is also required to be increased, and thus the recovery solution storage tank 72 having a large capacity is used. Therefore, the recovery solution 200 is also circulated between the recovery solution storage tank 72 and the treatment tank 73, using the pump 83, 84. The smaller the total quantity of the recovery solution 200, the higher the Li concentration will be, while the larger the total quantity of the same, the larger the total amount of recovered Li will be. For example, the total quantity of the recovery solution 200 can be half or so of the total quantity of the stock solution 100.

In this way, in order to allow the stock solution 100 and the recovery solution 200 to be circulated, it is required that the stock solution 100 and the recovery solution 200 be maintained to be in the state of a liquid during the treatment. Here, the stock solution 100 is presupposed to be a liquid in which there exists Li as ions, as in the seawater, the bittern, or the like, and even if the Li concentration is decreased as the treatment is progressed, the state of liquid of the stock solution 100 will be generally maintained. Especially, the bittern can be easily manufactured from the seawater, and in addition, has a Li concentration 50 to 100 times higher than that of the seawater, thereby being effective. On the other hand, the Li concentration of the recovery solution 200 is increased as the treatment is progressed, whereby there may occur a precipitate, or the like. If a precipitate is formed, circulation of the recovery solution 200 by the use of the pump 83, 84 will be difficult. However, if the recovery solution 200 after recovery of Li is transferred to another tank, or the like, where Li takes a form of a precipitate, the precipitate can be easily separated from the liquid, and it is particularly easy to extract the precipitate.

Further, as the raw material of Li for use with lithium ion batteries, and the like, lithium carbonate ($Li_2CO_3$) is used, and $Li_2CO_3$ is known to be a material which can be easily handled. Thus, it is preferable to finally recover Li in the form of $Li_2CO_3$. However, with this metal ion recovery device 6, in the case where $Li_2CO_3$ is generated in the recovery solution 200, the $Li_2CO_3$ will become the above-mentioned precipitate. Therefore, from the viewpoint of the necessity for circulating the recovery solution 200, it is preferable that $Li_2CO_3$ be not formed in the recovery solution 200.

Here, $Li_2CO_3$ can be easily generated by the following reaction:

[Chemical formula 1]

$$LiCl + Na_2CO_3 \rightarrow Li_2CO_3 + NaCl \quad (1)$$

In other words, by causing lithium chloride (LiCl) to be reacted with sodium carbonate ($Na_2CO_3$), $Li_2CO_3$ and sodium chloride (NaCl) can be generated. Here, it is desirable that lithium chloride (LiCl) be in the state of an aqueous solution in which lithium chloride (LiCl) exists as a Li ion and a Cl ion. Accordingly, by forming the recovery solution 200 after treatment as a lithium chloride aqueous solution, and adding a $Na_2CO_3$ aqueous solution thereto, the above-mentioned reaction is caused to be generated, and then for the first time, $Li_2CO_3$ can be extracted as a precipitate in such aqueous solution. Specifically, for example, the recovery solution 200 may be transferred from the recovery solution storage tank 72 to another tank, or the like, for performing a heating treatment, or the like, and after the Li concentration having been increased to 10% or so, the recovery solution 200 may be transferred to another tank, or the like, where an $Na_2CO_3$ aqueous solution is added thereto.

To do this, it is particularly preferable that, as the recovery solution 200, a hydrochloric acid (HCl) solution be used. In this case, the recovery solution 200 after treatment is provided as a LiCl aqueous solution, and the state in which no precipitate is generated in the recovery solution 200 can be maintained. Thereafter, the recovery solution 200 after treatment is concentrated, and then added with a $Na_2CO_3$ aqueous solution, whereby $Li_2CO_3$ can be precipitated in an NaCl aqueous solution (salt water) to allow $Li_2CO_3$ to be easily extracted. Thereafter, by cleaning the $Li_2CO_3$ with pure water, or the like, $Li_2CO_3$ powder in a high concentration can be obtained.

In other words, for the configuration in FIG. 6, it is particularly preferable to use hydrochloric acid as the recovery solution 200. In this case, as the material for the negative electrode 11, it is particularly preferable to use a Pt (coated) electrode, or the like, which has a resistance to hydrochloric acid.

Actually, using the configuration in FIG. 6, experiments for recovering Li from the Li aqueous solution were conducted. Hereinbelow, the results of the experiments will be explained.

Example 1

Figure 7:
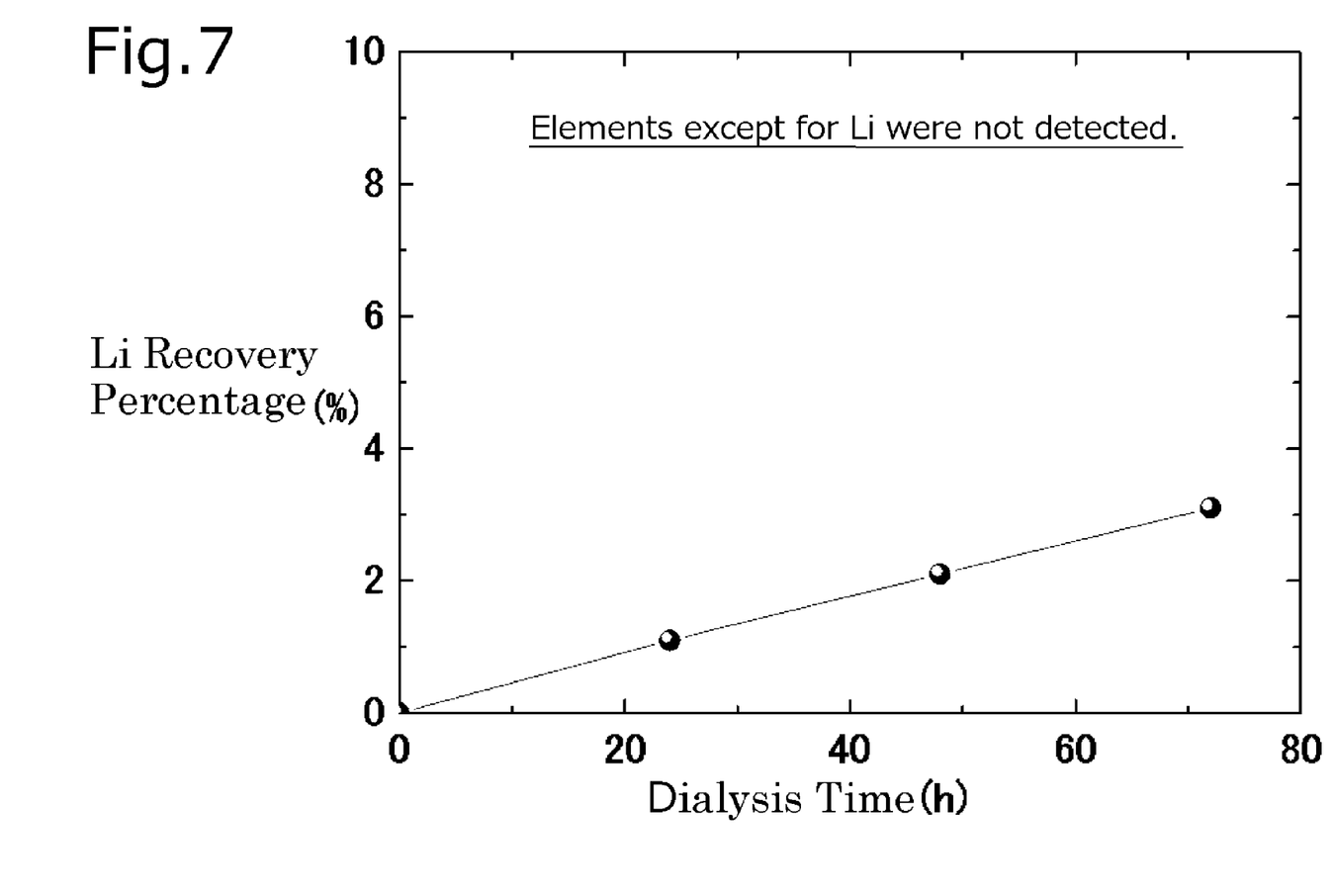
FIG. 7 gives a result of determination of a relationship between a given period of energizing time and the Li recovery percentage in Example 1.

With the configuration in FIG. 6 (with no current collector), by using, as the permselective membrane 10, $Li_{1+x+y}Al_x(Ti, Ge)_{2-x}Si_yP_{3-y}O_{12}$, which is an Li substitutional NASICON type crystal, having an effective membrane area of 11.3 cm², using 400 ml of the seawater as a stock solution, and 200 ml of 0.001 mol/l hydrochloric acid as a recovery solution; and applying a voltage of 1 V across the positive electrode and the negative electrode, the Li recovery percentages for given periods of energizing time (dialysis time) were determined. Here, the Li recovery percentage means the reduction percentage in Li concentration in the stock solution, and the absolute value of the reduction was equal to the absolute value of the increase in Li concentration in the recovery solution. The result of determination is given in FIG. 7.

From this result, it was confirmed that Li can be recovered from the seawater. At this time, the plasma emission spectroscopic analysis of the recovery solution showed that Na, Mg, K, and the like, which are ingredients other than Li in the seawater, were not significantly detected.

Example 2

Figure 8:
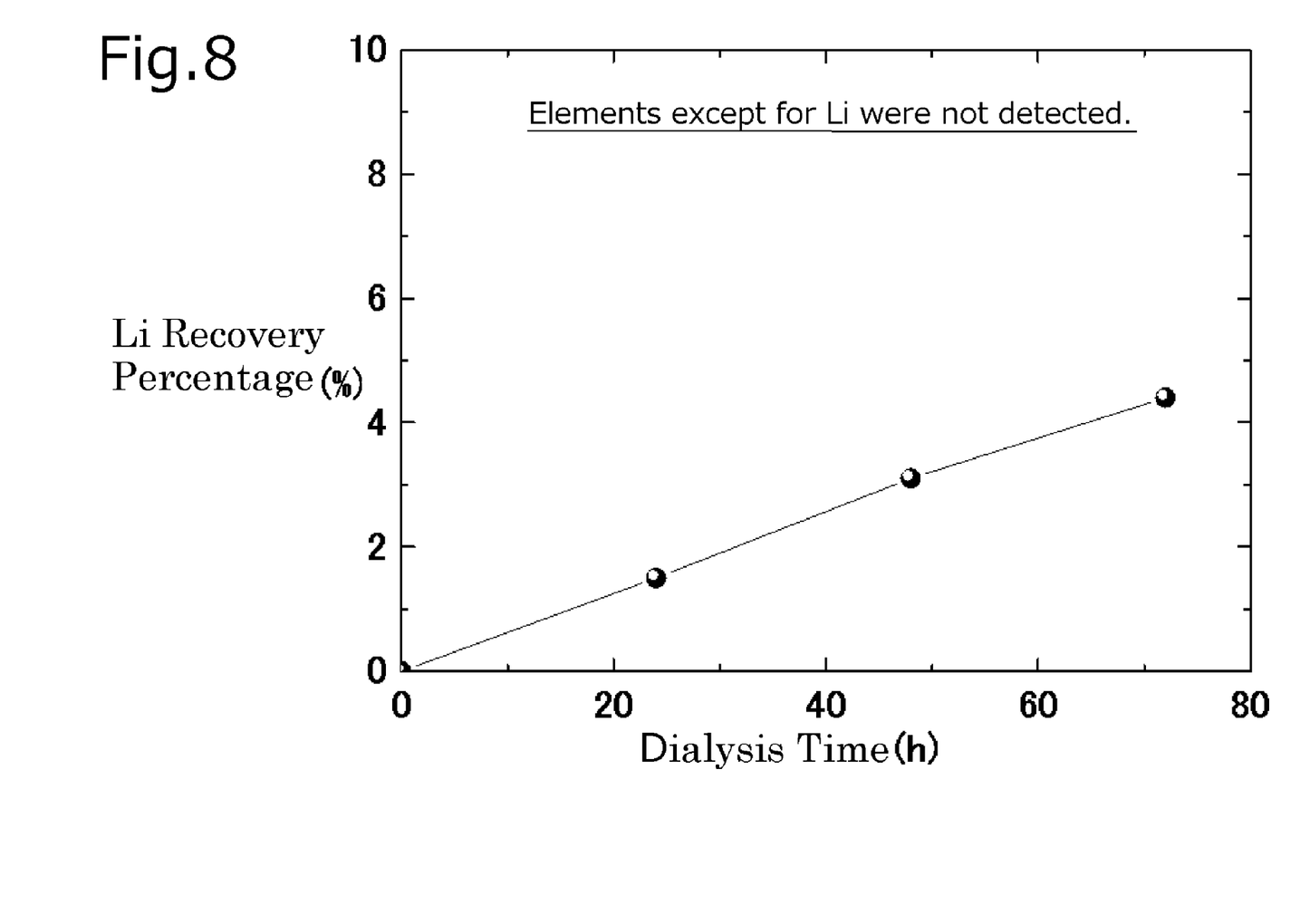
FIG. 8 gives a result of determination of a relationship between a given period of energizing time and the Li recovery percentage in Example 2.

In the configuration in FIG. 6, an electrically conductive carbon felt was used as the current collector, and with the other conditions used being the same as those in Example 1, Li was recovered from the seawater. The result of determination is given in FIG. 8. From this result, it was confirmed that, in the case of a current collector having been used, the Li recovery efficiency was increased by 1.5 times or so. Also in this case, Na, Mg, K, and the like, were not significantly detected in the recovery solution.

Example 3

Figure 9:
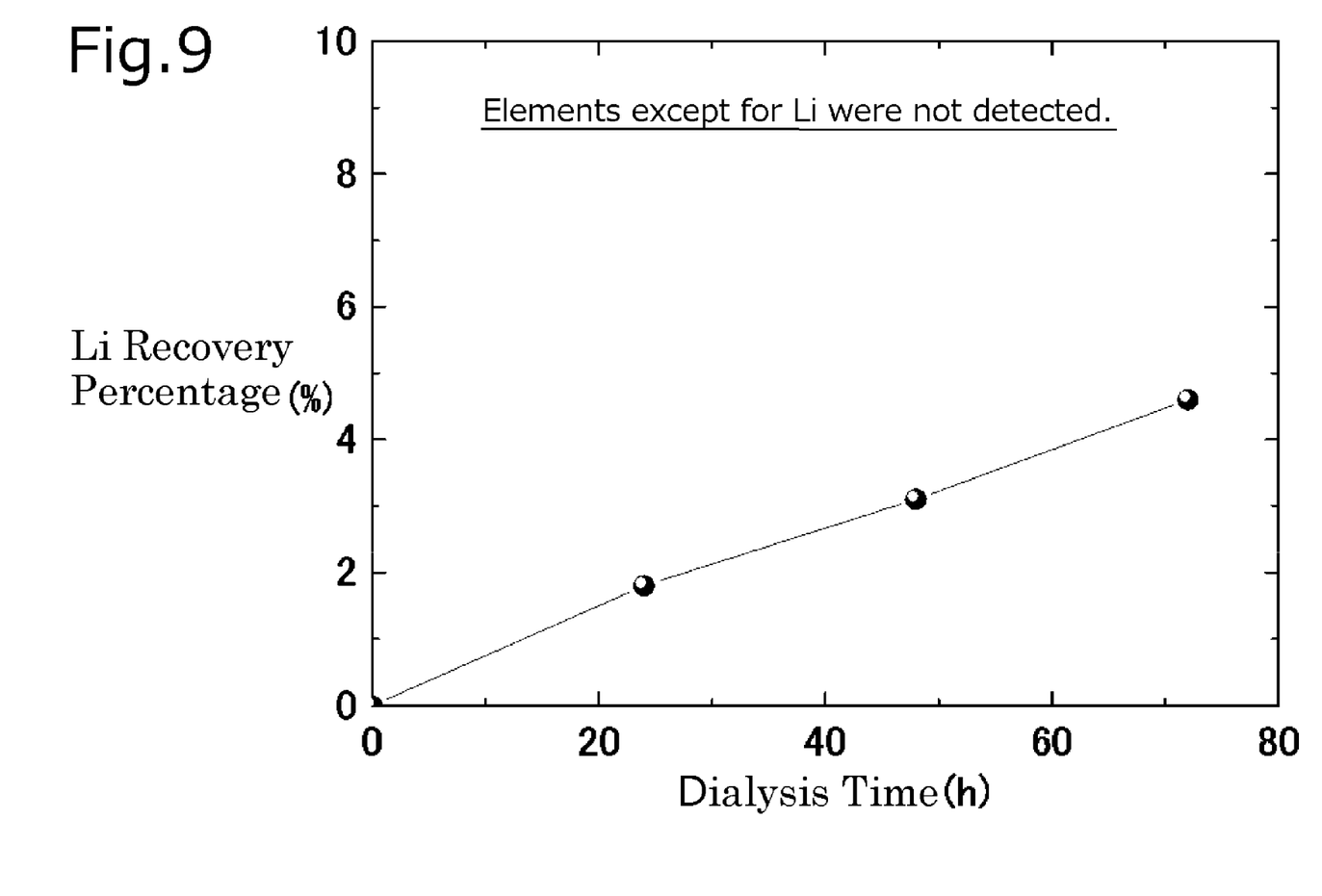
FIG. 9 gives a result of determination of a relationship between a given period of energizing time and the Li recovery percentage in Example 3.

In the same configuration as that in Example 2, instead of the seawater, bittern (a solution after the salt (NaCl) having been extracted from the seawater) was used as the stock solution, and the result of determination is given in FIG. 9. Also in this case, Li could be recovered in the same manner, and in the recovery solution, Na, Mg, K, and the like, were not significantly detected.

Example 4

Figure 10:
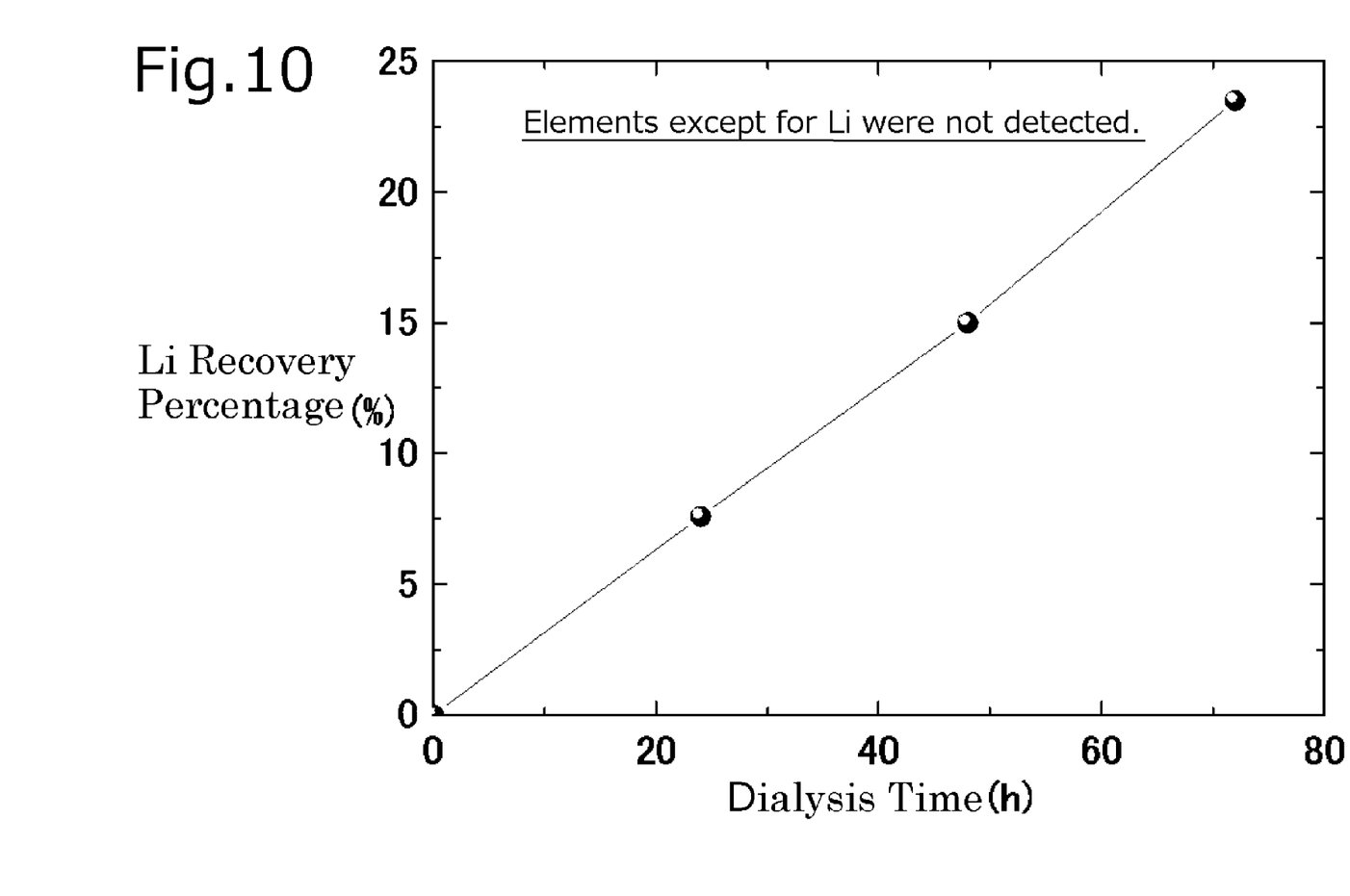
FIG. 10 gives a result of determination of a relationship between a given period of energizing time and the Li recovery percentage in Example 4.

The same current collector as that in Example 2 was used, and with a configuration which is constituted by three permselective membranes combined as shown in FIG. 5, determination was performed in the same manner as in Example 3. The result thereof is given in FIG. 10. In proportion to the area, the recovery efficiency three times as high as that in Example 3 was obtained. Further, also in this case, Na, Mg, K, and the like, were not significantly detected in the recovery solution.

Example 5

Figure 11:
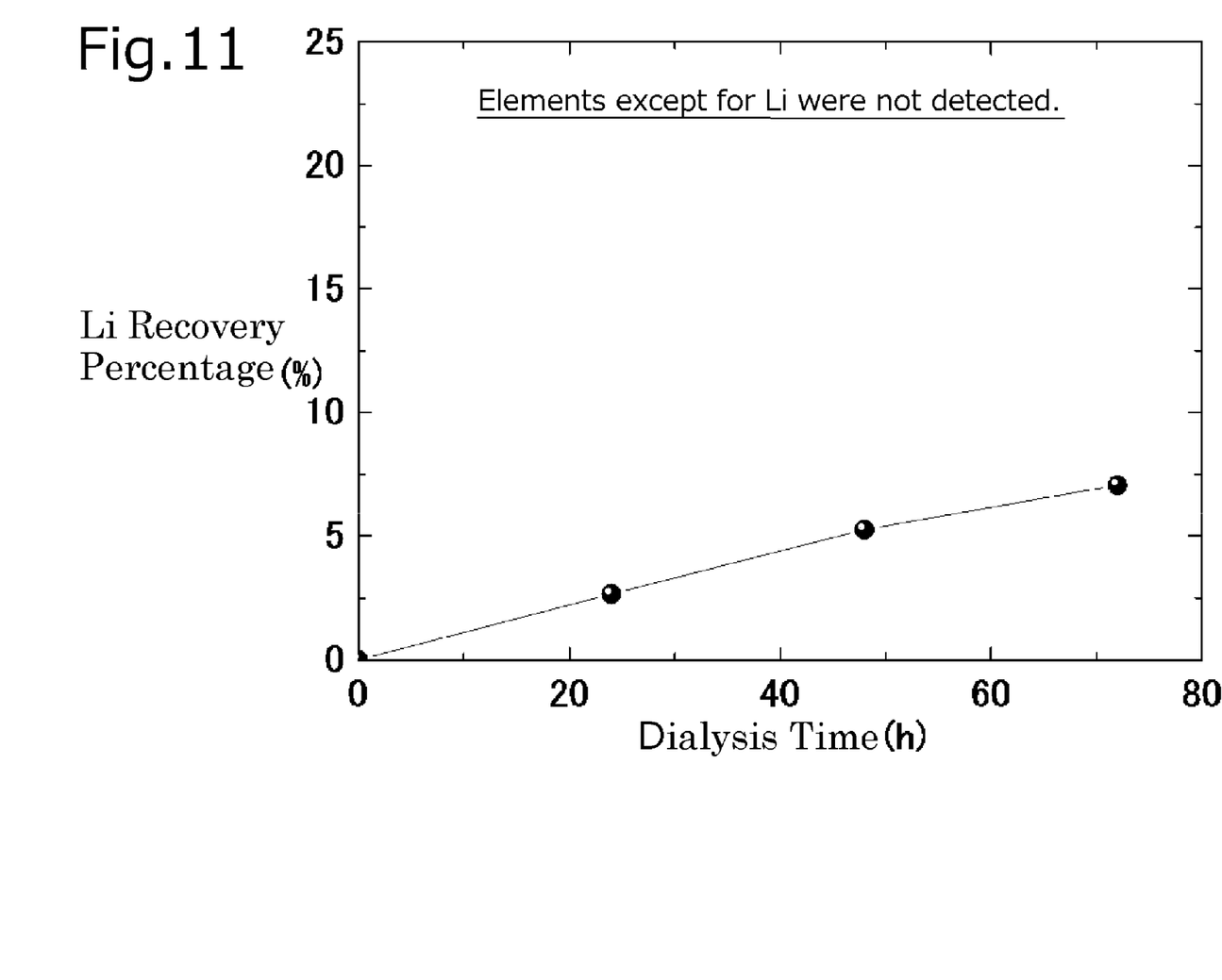
FIG. 11 gives a result of determination of a relationship between a given period of energizing time and the Li recovery percentage in Example 5.

In the same configuration as that in Example 4, with no voltage being applied across the positive electrode and the negative electrode, determination was performed in the same manner. The result thereof is given in FIG. 11. Even if no voltage was applied, a potential difference of 0.4 V was actually generated across the positive electrode and the negative electrode by an electrochemical reaction. Thereby, it was confirmed that, although the recovery efficiency is low as compared to that in Example 4 in which a voltage was applied, Li could be recovered. Further, also in this case, Na, Mg, K, and the like, were not significantly detected in the recovery solution. In other words, it was indicated that, with no use of electric power, Li can be recovered.

Example 6

Figure 12:
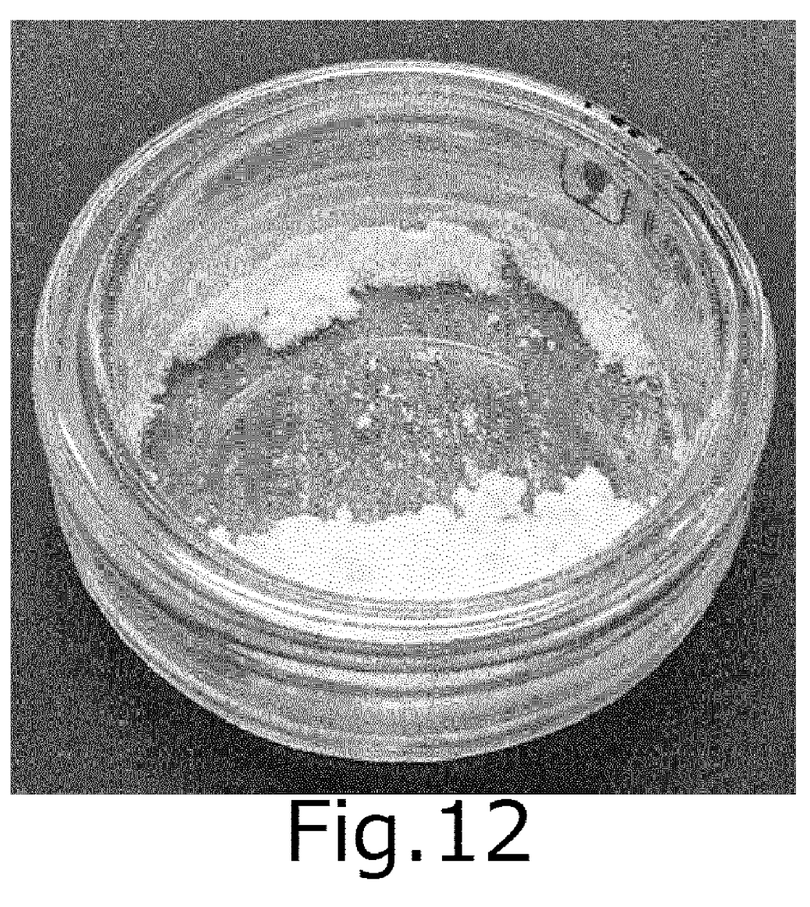
FIG. 12 is an appearance photograph of powder recovered in one of Examples 1 to 5.
Figure 13:
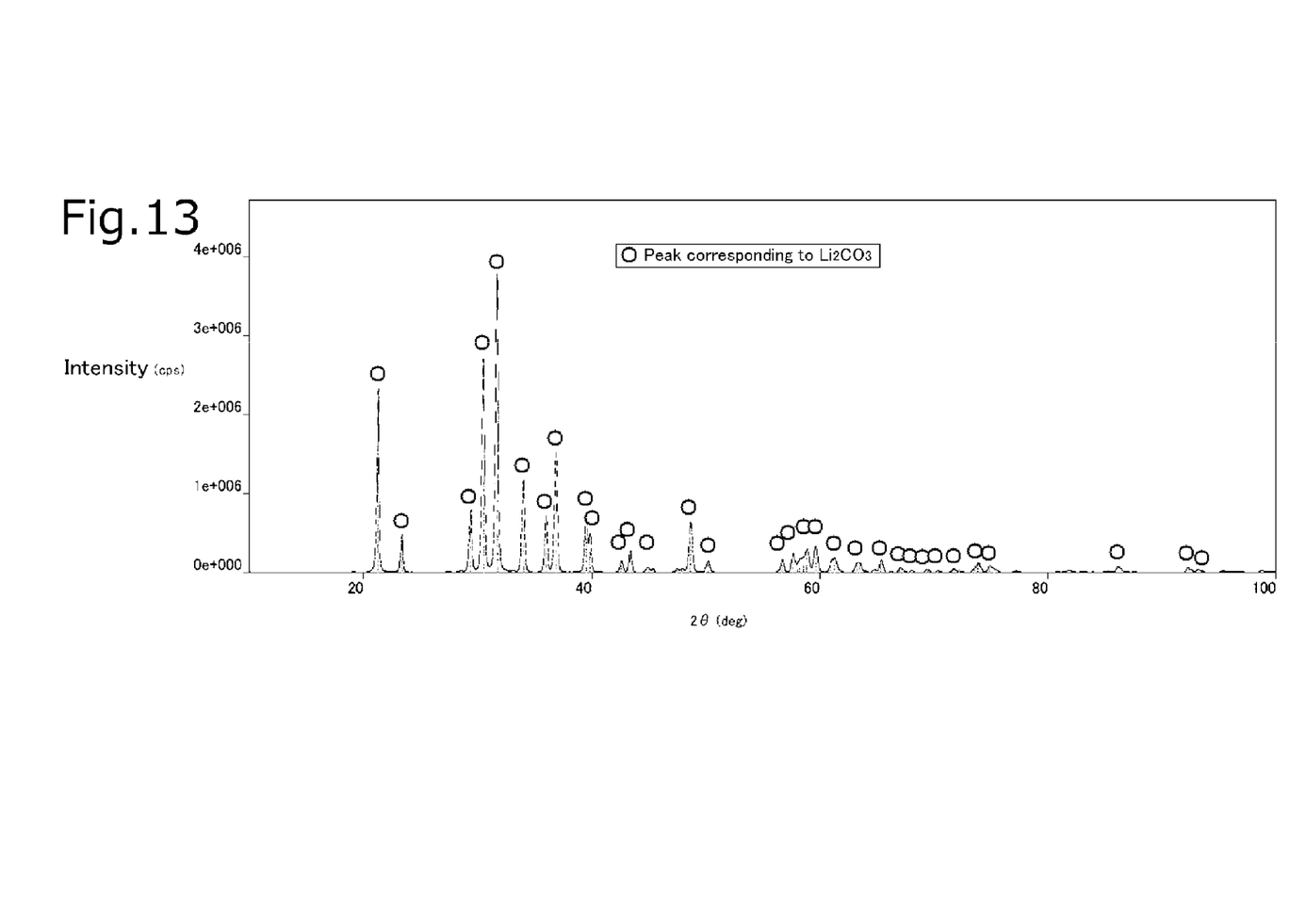
FIG. 13 gives a result of powder X-ray diffraction measurement of powder recovered in one of Examples 1 to 5.

Next, as a result of the recovery solutions obtained in Examples 1 to 5 having been heated in vacuum, a lithium chloride aqueous solution having a concentration of 10% or so was obtained, and by adding sodium carbonate ($Na_2CO_3$) thereto, a precipitate was obtained. FIG. 12 is an appearance photograph showing white powder as a result of this precipitate having been extracted and dried. FIG. 13 gives a result of powder X-ray diffraction measurement made on this powder. Here, a circular mark indicates a diffraction peak (known) corresponding to a crystal plane of $Li_2CO_3$. As a result of this, most of the peaks given by the X-ray diffraction coincided with those of lithium carbonate ($Li_2CO_3$), and it was confirmed that the principal ingredient of this powder was lithium carbonate.

In the above-mentioned examples, the metal to be recovered was assumed to be lithium (Li), however, considering from the principle, it is obvious that the above-mentioned metal ion recovery device and recovery method are effective to other metals (ions), especially to alkaline metals. For example, also for Na, Cs, K, and Mg, which constitute a super ion conductor in the same manner as Li, by using such super ion conductor as the above-mentioned permselective membrane, the same effect will be provided. Especially, for Cs, K, and Mg, which are relatively difficult to be recovered at a high efficiency as compared to Na, which can be obtained as NaCl, or the like, at a high efficiency, the above-mentioned configuration is effective.

DESCRIPTION OF SYMBOLS

The symbols 1 and 6 denote a metal (Li) ion recovery device; 8 and 73 a treatment tank; 10 a permselective membrane; 11 a negative electrode; 12 a positive electrode; 30 a current collector; 31 a bonding layer; 50 an Li ion; 60 a partition; 61 an anode for electrodialysis; 62 a cathode for electrodialysis; 71 a stock solution storage tank; 72 a recovery solution storage tank; 74 and 75 a stock solution piping; 76 and 77 a recovery solution piping; 81 to 84 a pump; 100 a stock solution; and 200 a recovery solution.

What is claimed is:

1. A metal ion recovery device for, from a stock solution as an aqueous solution containing a lithium (Li) in the form of Li ion, recovering Li ion into a recovery solution, comprising:
    a plate-shaped permselective membrane constituted by an ion conductor of Li,
    a mesh-shaped positive electrode electrically connected and fixed to one main face of said permselective membrane, and
    a mesh-shaped negative electrode electrically connected and fixed to another main face of said permselective membrane, said stock solution and said recovery solution being partitioned by said permselective membrane, said positive electrode and said negative electrode being fixed thereto.

2. The metal ion recovery device according to claim 1, wherein, between the one main face of said permselective membrane and said positive electrode, and between the another main face of said permselective membrane and said negative electrode, a porous and electrically conductive current collector made of a different material than both the positive electrode and the negative electrode is inserted, respectively.

3. The metal ion recovery device according to claim 2, wherein,
    said permselective membrane is composed of several parts made of sintered compacts in an in-plane direction,
    said current collector is fixed to said one main face, and to said another main face of said permselective membrane, respectively,
    said positive electrode is fixed to said current collector formed on said one main face, and
    said negative electrode is fixed to said current collector formed on said another main face.

4. The metal ion recovery device according to claim 2, wherein said current collector is formed of a carbon felt.

5. The metal ion recovery device according to claim 1, wherein there is provided a configuration in which said recovery solution is circulated.

6. The metal ion recovery device according to claim 1, where said recovery solution is hydrochloric acid (HCl).

7. A metal ion recovery method for recovering Li ion contained in said stock solution into said recovery solution by using the metal ion recovery device according to claim 1.

8. The metal ion recovery method according to claim 7, wherein a voltage is applied across said positive electrode and said negative electrode.

9. A metal ion recovery method for recovering Li ion contained in said stock solution into said recovery solution by using the metal ion recovery device according to claim 1, and then adding sodium carbonate ($Na_2CO_3$) to said recovery solution.

10. The metal ion recovery device according to claim 1, wherein, Li ionic conductivity of said permselective membrane is higher than or equal to $10^{-4}$ S·cm$^{-1}$.

11. The metal ion recovery device according to claim 10, where said permselective membrane is formed of any one of $Li_3N$, $Li_{10}GeP_2S_{12}$, $(La_x, Li_y)TiO_z$ (where $x=2/3-a$, $y=3a-2b$, $z=3-b$, $0<a\leq1/6$, $0\leq b\leq0.06$, and $y>0$), and $Li_{1+x+y}Al_x(Ti, Ge)_{2-x}Si_yP_{3-y}O_{12}$ (where $0\leq x\leq0.6$, and $0\leq y\leq0.6$).

* * * * *